(12) United States Patent
Kitabatake et al.

(10) Patent No.: US 7,108,361 B2
(45) Date of Patent: Sep. 19, 2006

(54) INK TANK

(75) Inventors: Kenji Kitabatake, Kanagawa (JP); Yasuo Kotaki, Kanagawa (JP); Keisuke Matsuo, Kanagawa (JP); Toshihiko Ujita, Kanagawa (JP); Hiromasa Amma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 10/833,107

(22) Filed: Apr. 28, 2004

(65) Prior Publication Data
US 2004/0233258 A1 Nov. 25, 2004

(30) Foreign Application Priority Data
May 22, 2003 (JP) ............... 2003-145469

(51) Int. Cl.
*B41J 2/175* (2006.01)
*F16K 15/14* (2006.01)

(52) U.S. Cl. ............... 347/86; 347/84; 137/859
(58) Field of Classification Search .......... 347/86; 137/859
See application file for complete search history.

(56) References Cited

U.S. PATENT DOCUMENTS

| 2,646,063 | A | * | 7/1953 | Hayes ............... 137/218 |
|---|---|---|---|---|
| 3,270,771 | A | | 9/1966 | Morgan et al. |
| 5,643,195 | A | * | 7/1997 | Drevet et al. ............... 604/9 |
| 6,000,778 | A | * | 12/1999 | Koitabashi et al. ........... 347/23 |
| 6,039,441 | A | * | 3/2000 | Tomikawa et al. ........... 347/86 |
| 6,286,947 | B1 | | 9/2001 | Kitabatake et al. |
| 6,394,137 | B1 | * | 5/2002 | Kikuchi et al. ............. 137/859 |
| 6,505,925 | B1 | | 1/2003 | Kitabatake et al. |
| 6,543,876 | B1 | | 4/2003 | Kotaki |
| 6,547,108 | B1 | * | 4/2003 | Johanson ............... 222/387 |
| 6,935,730 | B1 | | 8/2005 | Qingguo et al. |
| 2002/0109760 | A1 | * | 8/2002 | Miyazawa et al. ........... 347/86 |
| 2002/0154200 | A1 | | 10/2002 | Miyazawa et al. |
| 2002/0171723 | A1 | * | 11/2002 | Ota et al. ............... 347/86 |
| 2002/0180849 | A1 | * | 12/2002 | Sakai et al. ............... 347/86 |
| 2003/0128260 | A1 | | 7/2003 | Ujita et al. |

FOREIGN PATENT DOCUMENTS

| EP | 1 281 897 | 2/2003 |
|---|---|---|
| JP | 2003-34041 | 2/2003 |

* cited by examiner

*Primary Examiner*—Vip Patel
*Assistant Examiner*—Shelby Fidler
(74) *Attorney, Agent, or Firm*—Fitzpatrick, Cella, Harper & Scinto

(57) ABSTRACT

An ink tank capable of a stable ink supply to a print head uses a simple valve construction. In one preferred example, an ink path is closed by a lip portion of a valve rubber engaging a flange, and an angle formed by an inner surface of an opening in the lip portion and an engagement surface of the flange is an acute angle.

1 Claim, 23 Drawing Sheets

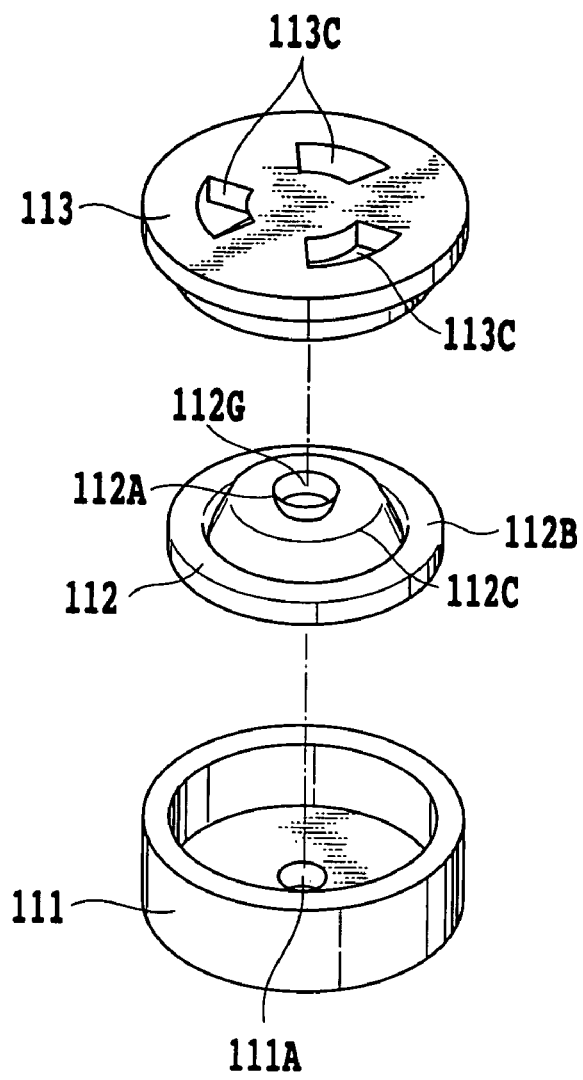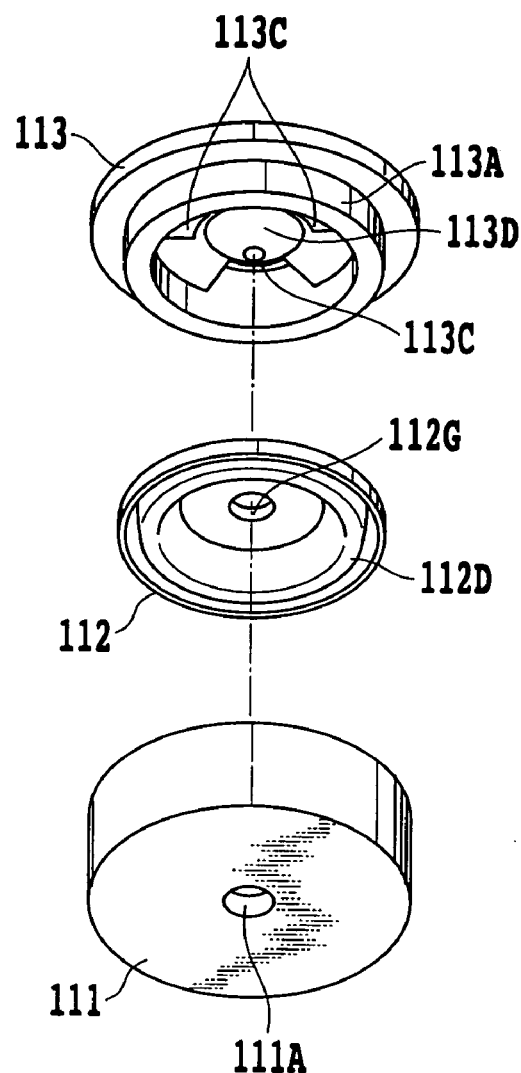
FIG.21AFIG.21B

INK TANK

This application claims priority from Japanese Patent Application No. 2003-145469 filed May 22, 2003, which is incorporated hereinto by reference.

BACKGROUND OF THE INVENTION

1. Field of the Invention

The present invention relates to an ink tank having a valve to open and close a path through which ink is drawn out from the ink tank.

2. Description of the Related Art

In a construction that uses a spring to bias the valve film, as in Patent Reference 1, there are drawbacks of an increased parts count because the spring is used and a possibility of degraded manufacturing efficiency of the ink tank because the spring needs to be assembled. Any deviation of an installation position of the spring results in variations in the force applied to the valve film, so a means to restrain the spring mounting position is also required. That is, a spring, a small part, needs to be mounted correctly while it is restrained in its mounting position. This makes the ink tank assembly work more complicated. Further, the fact that the spring is in contact with ink makes it difficult to select an appropriate material for the spring that can maintain the spring function and still does not adversely affect the property of ink. This may necessitate a change in the ink composition. Further, in the ink tank disclosed in the figure of Patent Reference 1, since the ink path is closed by urging a planar portion of the valve film against a flat portion of the valve seat by a spring, it is necessary to increase a surface precision of the valve disc, which in turn may degrade the manufacturing efficiency. Further, if, to compensate for a bad surface precision of the valve seat, the spring biasing force is increased to enhance the level of intimate contact between the valve seat and the valve film, the negative pressure on the ink supply port side generated by the ink ejection from the print head may not be able to overcome the biasing force of the spring, with the result that the valve film may fail to part from the valve seat, leaving the ink path closed.

The open-close action of this valve film supplies ink under a predetermined negative pressure to the print head and thereby keeps ink in the print head at a desired negative pressure.

In a construction that uses a spring to bias the valve film, as in Patent Reference 1, there are drawbacks of an increased parts count because the spring is used and a possibility of degraded manufacturing efficiency of the ink tank because the spring needs to be assembled. Any deviation of an installation position of the spring results in variations in the force applied to the valve film, so a means to restrain the spring mounting position is also required. That is, a spring, a small part, needs to be mounted correctly while it is restrained in its mounting position. This makes the ink tank assembly work that much complicated. Further, the fact that the spring is in contact with ink makes it difficult to select an appropriate material for the spring that can maintain the spring function and still does not adversely affect the property of ink. This may necessitate a change in the ink composition. Further, in the ink tank disclosed in the figure of Patent Reference 1, since the ink path is closed by urging a planar portion of the valve film against a flat portion of the valve seat by a spring, it is necessary to increase a surface precision of the valve disc, which in turn may degrade the manufacturing efficiency. Further, if, to compensate for a bad surface precision of the valve seat, the spring biasing force is increased to enhance the level of intimate contact between the valve seat and the valve film, the negative pressure on the ink supply port side generated by the ink ejection from the print head may not be able to overcome the biasing force of the spring, with the result that the valve film may fail to part from the valve seat, leaving the ink path closed.

SUMMARY OF THE INVENTION

An object of this invention is to provide an ink tank capable of supplying ink stably to a print head by adopting a simple valve construction.

In the first aspect of the present invention, there is provided an ink tank comprising:
an ink accommodation portion;
an ink supply port; and
a valve installed in an ink path between the ink accommodation portion and the ink supply port;
wherein the valve is deformed to temporarily open the ink path to introduce ink from the ink accommodation portion to the ink supply port;
wherein the valve has a valve member formed of an elastic material and having an opening on an inner side and a valve case accommodating the valve member;
wherein an inner end of the opening in the valve member engages the valve case to close the ink path, and an angle formed by an inner surface of the opening in the valve member and a surface of the valve case with which the valve member engages is an acute angle.

In the second aspect of the present invention, there is provided an ink tank comprising:
an ink accommodation portion;
an ink supply port; and
a valve installed in an ink path between the ink accommodation portion and the ink supply port;
wherein the valve is deformed to temporarily open the ink path to introduce ink from the ink accommodation portion to the ink supply port;
wherein the valve has a valve member formed of an elastic material and a valve case accommodating the valve member;
wherein an annular lip, a part of the valve member, is pressed to cause an end portion of the lip extending in a circumferential direction of the lip to make a circumferential seal and thereby close the ink path;
wherein, in the closed state, the end portion of the lip expands in a radial direction when compared with the end portion in an open state.

In the third aspect of the present invention, there is provided an ink tank comprising:
an ink accommodation portion;
an ink supply port; and
a valve installed in an ink path between the ink accommodation portion and the ink supply port;
wherein the valve is deformed to temporarily open the ink path to introduce ink from the ink accommodation portion to the ink supply port;
wherein the valve has a valve member formed of an elastic material and having an opening at an end thereof;
wherein the ink path is opened when the opening in the valve member decreases in diameter as a result of ink being drawn out from the ink supply port.

With this invention, an inner end of the opening in the valve member formed of an elastic material engages the valve case to close the ink path, and an angle formed by an inner surface of the opening in the valve member and a surface of the valve case which the valve member engages is an acute angle. This construction can secure an intimate contact of the valve member with the valve case, thus realizing a reliable open-close operation of the valve. This in turn ensures a stable supply of ink to the ink supply port. The damper portion integrally included in the valve member enables a stable ink holding force (=negative pressure) to be applied to the ink supply port.

The above and other objects, effects, features and advantages of the present invention will become more apparent from the following description of embodiments thereof taken in conjunction with the accompanying drawings.

BRIEF DESCRIPTION OF THE DRAWINGS

FIG. 21A is an exploded perspective view of the valve of FIG. 20A as seen from above and FIG. 21B is an exploded perspective view of the valve of FIG. 20A as seen from below;

DETAILED DESCRIPTION OF PREFERRED EMBODIMENTS

With reference to the accompanying drawings, embodiments of this invention will be described in terms of "basic construction and operation" and "characteristic construction and operation."

[Basic Construction and Operation]

Figure 5:
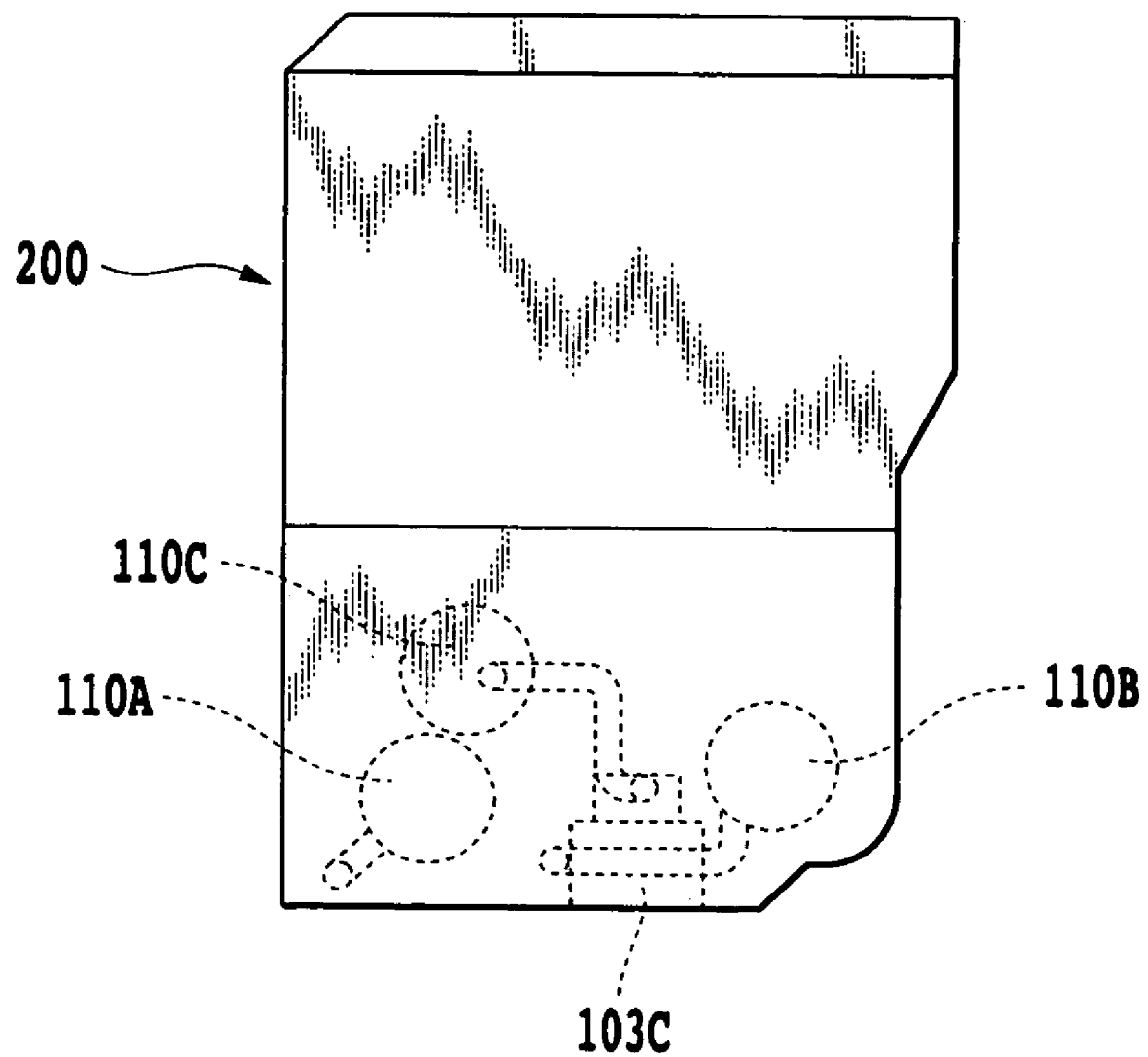
FIG. 5 is a schematic view showing a basic construction of an ink tank accommodating a plurality of different color inks.
Figure 6:
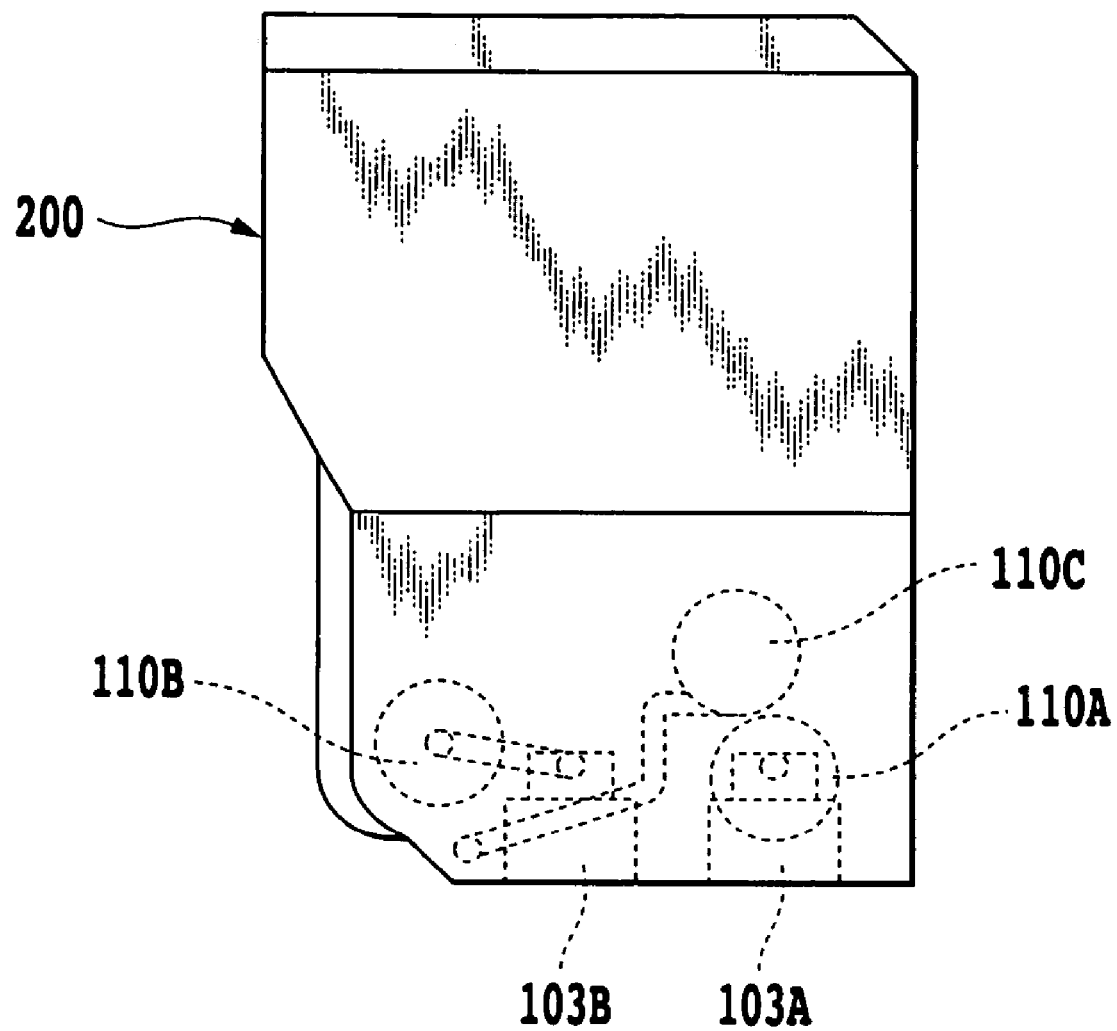
FIG. 6 is a rear view of the ink tank of FIG. 5.
Figure 7:
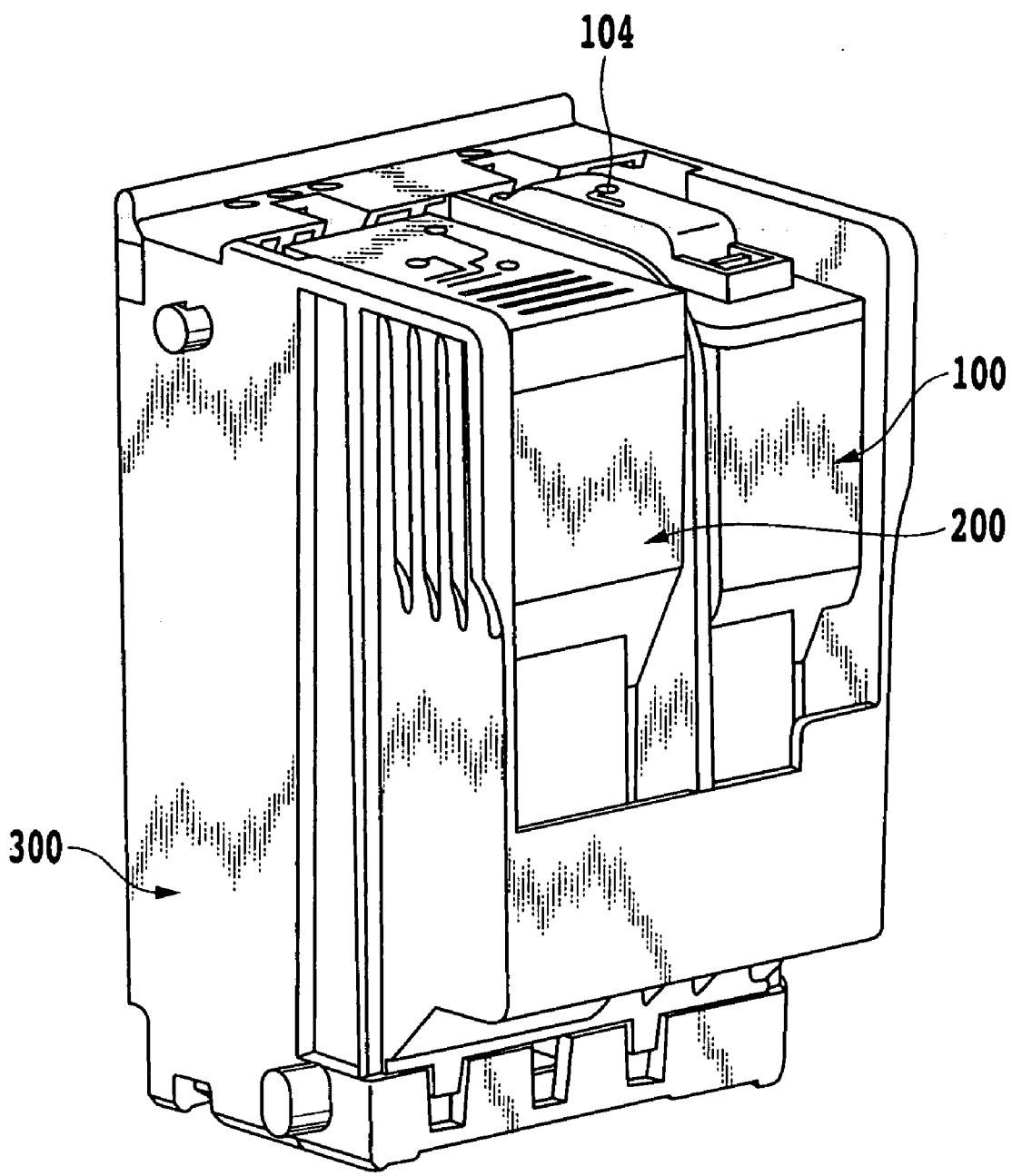
FIG. 7 is a perspective view of a head cartridge to which the ink tanks of FIG. 1 and FIG. 5 can be mounted.
Figure 8:
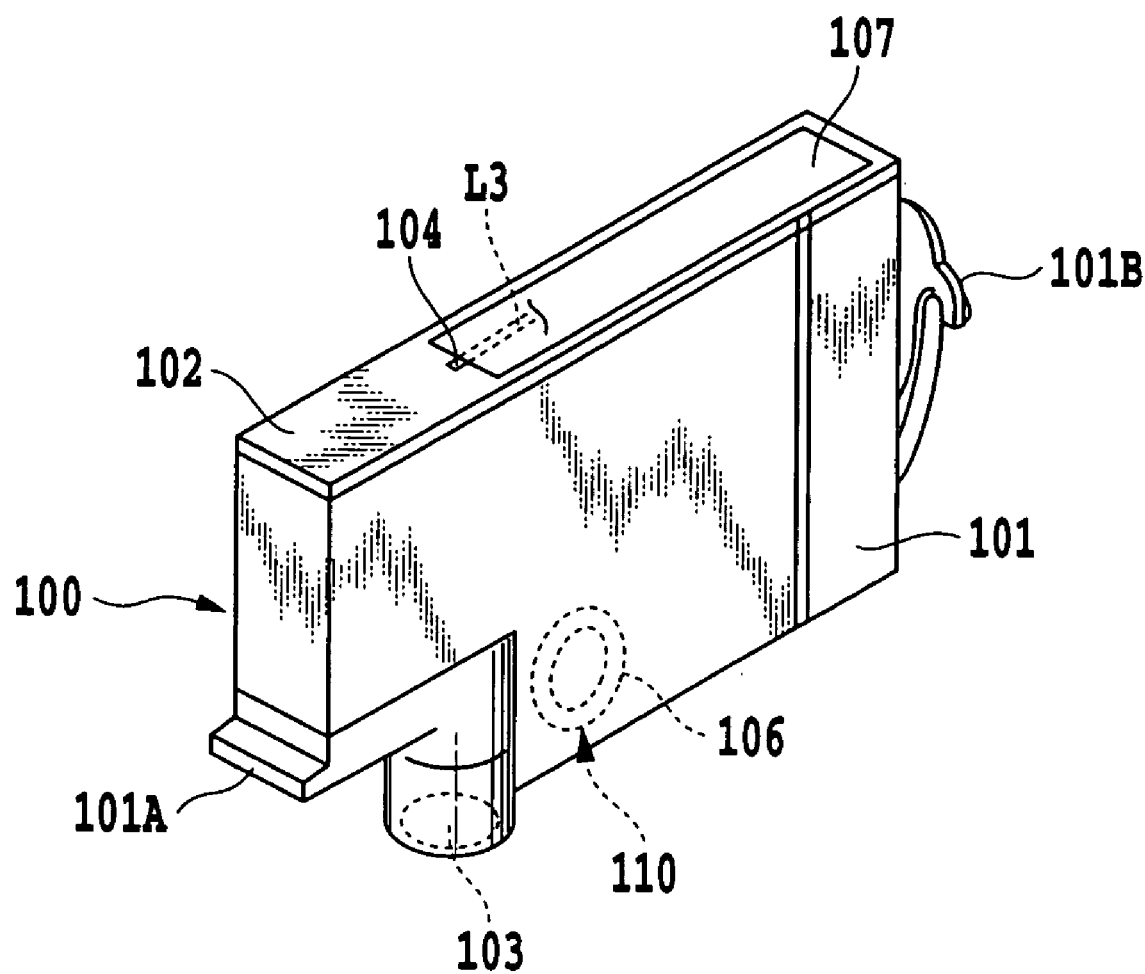
FIG. 8 is a schematic view showing another construction of an ink tank accommodating a single color ink.

FIG. 1 to FIG. 4 are schematic views showing a basic construction of an ink tank (ink cartridge) 100 accommodating only a single color ink (in this example, black ink). FIG. 5 and FIG. 6 are schematic views showing a basic construction of an ink tank (ink cartridge) 200 accommodating a plurality of different color inks (in this embodiment, magenta ink, cyan ink and yellow ink). FIG. 7 is a perspective view of a head cartridge 300 connectable to the ink tanks 100, 200. FIG. 8 is a perspective view of another construction of the ink tank 100 accommodating a single color ink.

Figure 1:
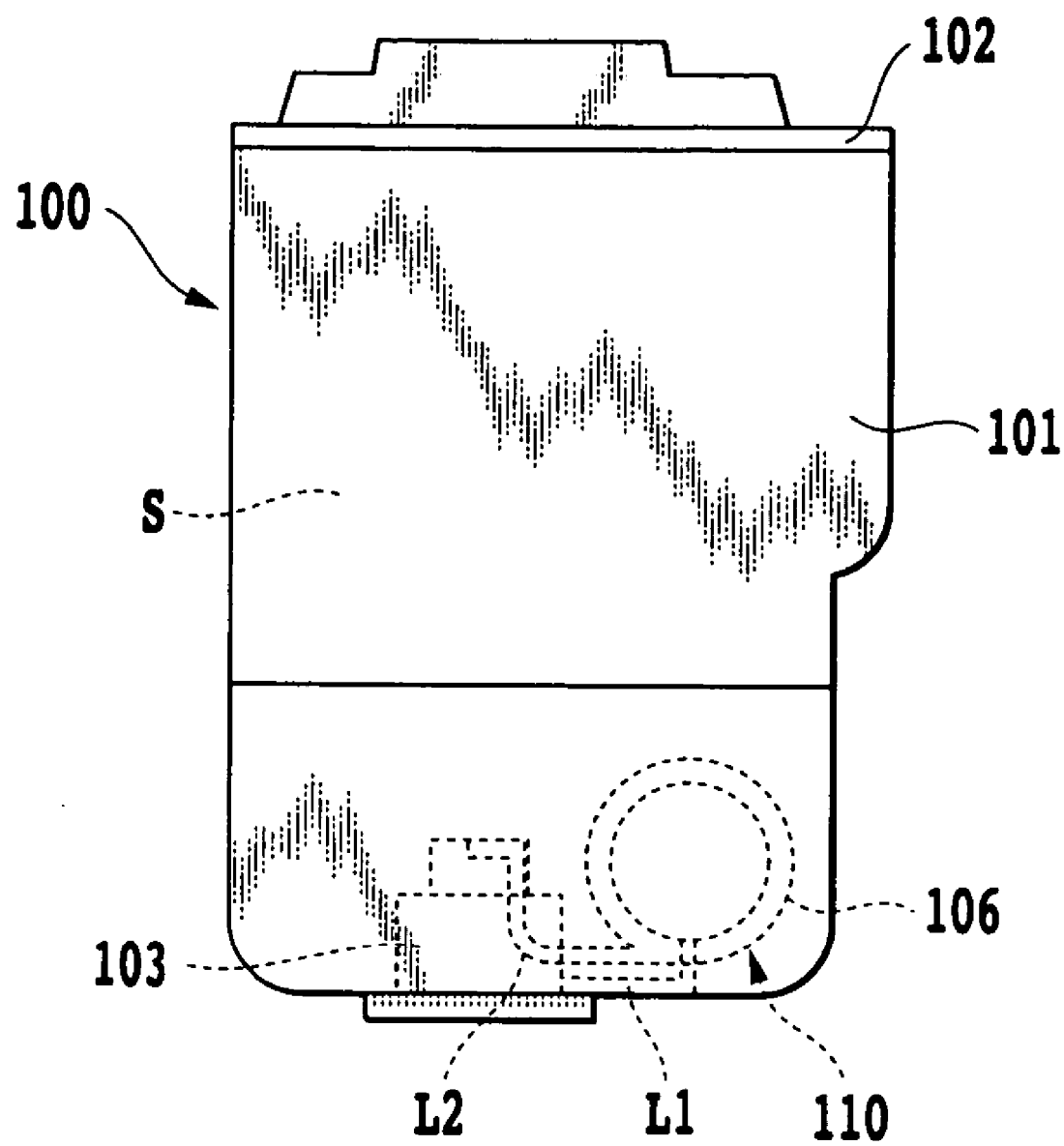
FIG. 1 is a schematic view showing a basic construction of an ink tank accommodating a single color ink.
Figure 2:
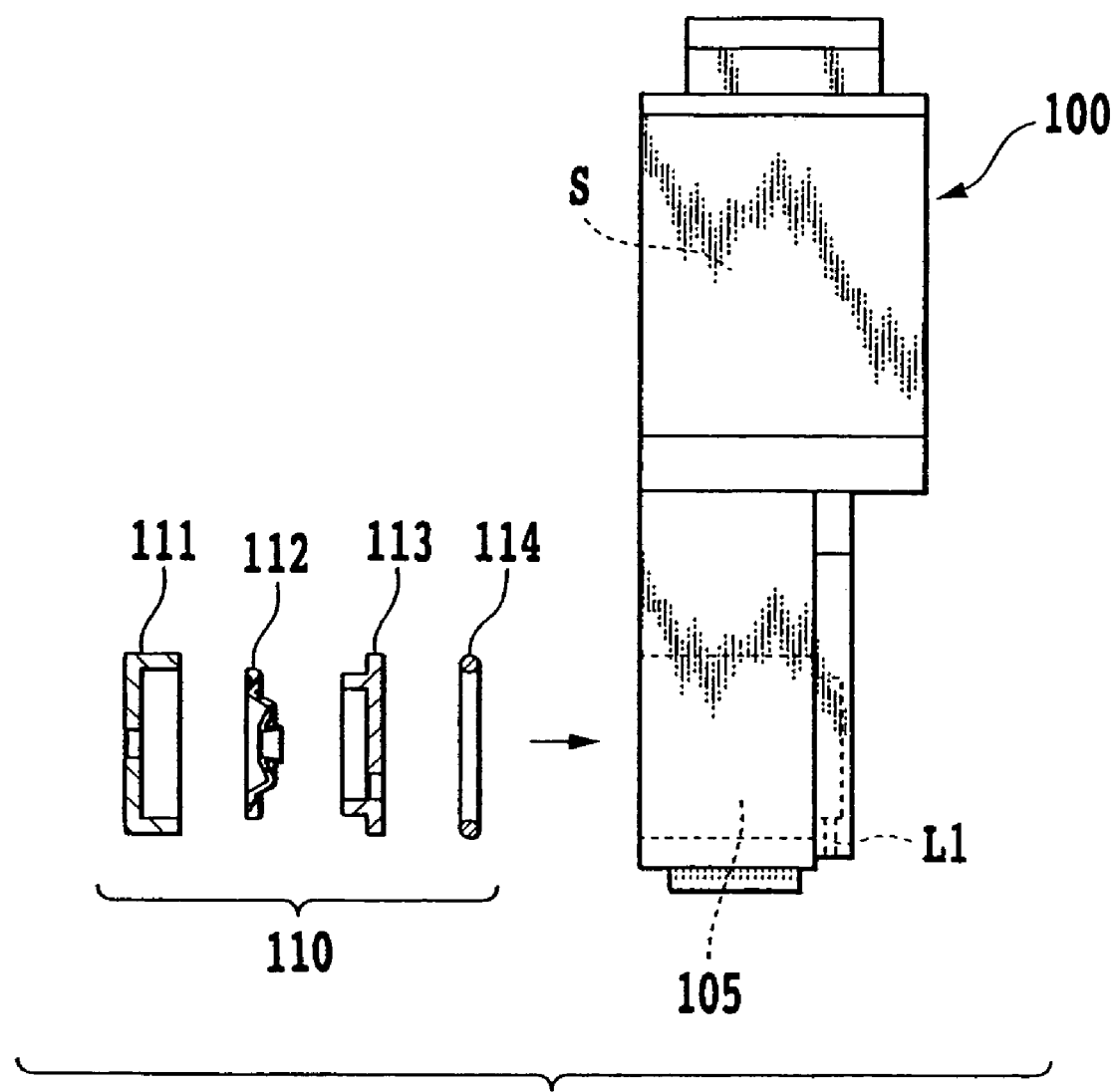
FIG. 2 is a side view of the ink tank of FIG. 1.
Figure 3:
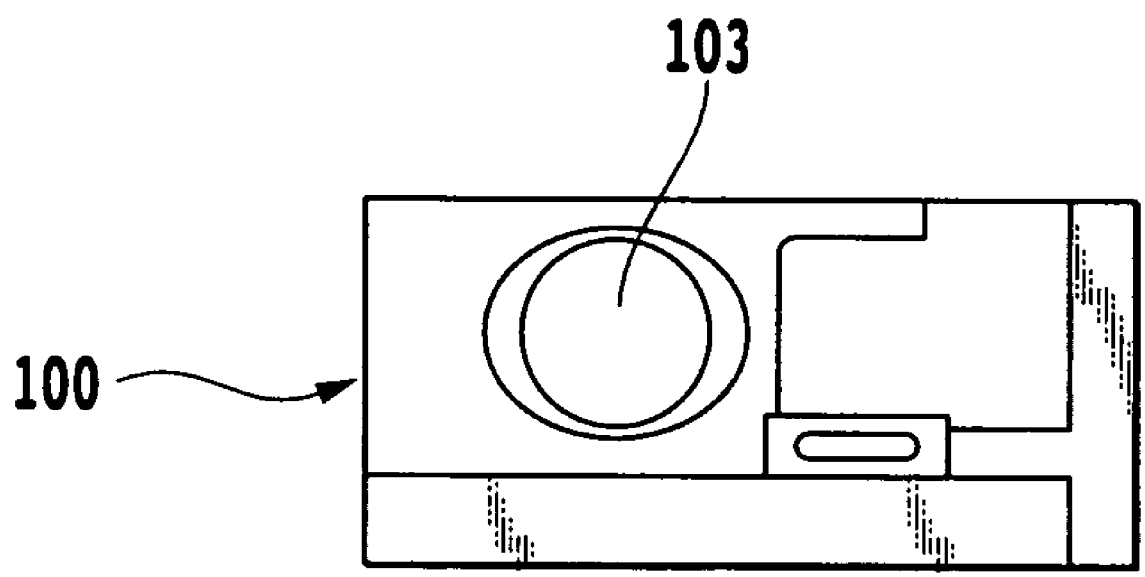
FIG. 3 is a bottom view of the ink tank of FIG. 1.
Figure 4:
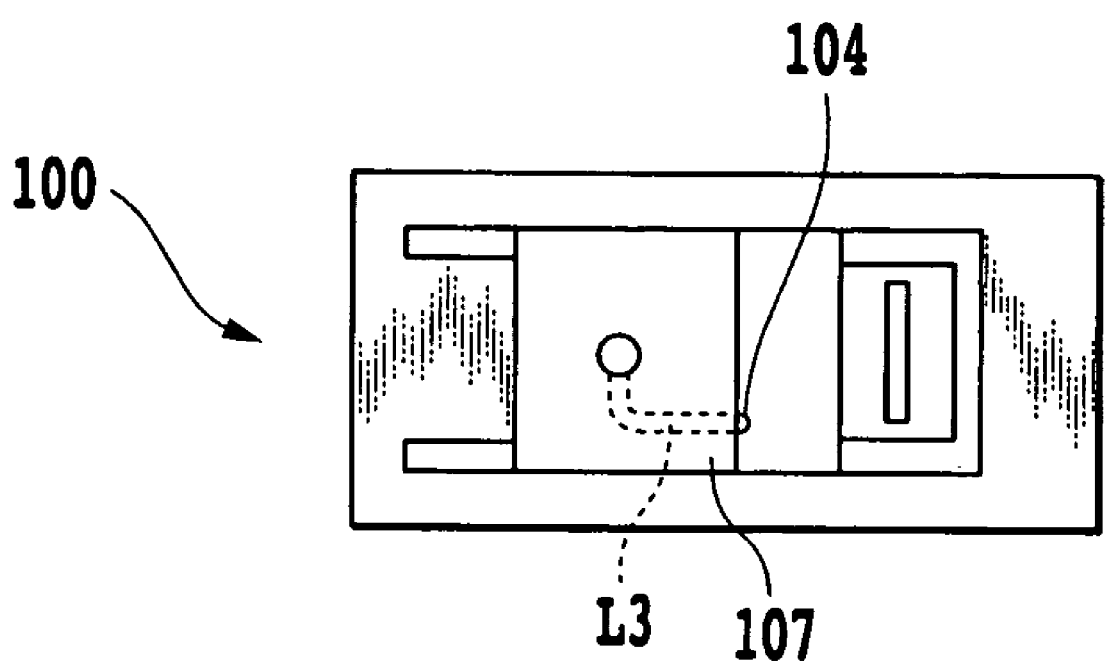
FIG. 4 is a top view of the ink tank of FIG. 1.

In the ink tank 100 that accommodates a single color ink (FIG. 1 to FIG. 4), a case 101 and a cover 102 are combined to form an ink accommodation space (ink accommodation portion) S therein. A lower part in the ink accommodation space S is connected to an ink supply port 103 through a valve 110 as a negative pressure generation means. An upper part in the ink accommodation space S is connected to an atmosphere communication hole 104. Inside the case 101 is formed a valve chamber 105 in which are incorporated a housing 111, a valve rubber 112, a flange 113 and, if necessary, an O-ring 114, all combining to form the valve 110. A right-side portion of the valve chamber 105 in FIG. 2 is communicated through a flow path L1 to the ink accommodation space S and a left-side portion of the valve chamber 105 is communicated through a flow path L2 to the ink supply port 103. Thus, the valve 110 in the valve chamber 105 is interposed between the ink accommodation space S and the ink supply port 103. The detailed construction of the valve 110 will be described later.

An opening of the left-side portion of the valve chamber 105 in FIG. 2 is closed with a valve film 106 that is fused to a surface of the case 101. The valve film 106 may also form the flow path L2. That is, the flow path L2 may be formed by forming a groove in the surface of the case 101 and fusing the valve film 106 to the surface of the case 101 to close an open part of the groove. A flow path L3 between the ink accommodation space S and the atmosphere communication hole 104 is defined by a groove formed in the surface of the cover 102 and a film 107 fused to the surface of the cover 102 to close an open part of the groove.

The ink tank 100 of this construction is connected to the head cartridge 300 as shown in FIG. 7 and then mounted on a printing apparatus. In a serial scan type printing apparatus, the ink tank 100 together with the head cartridge 300 is mounted on a carriage that moves in a main scan direction.

The head cartridge 300 has an ink jet print head that ejects ink supplied from the ink accommodation space S through the valve 110 and the ink supply port 103. This print head may, for example, be of a type that employs electrothermal transducers (heaters) or piezoelectric elements in ejecting ink. When the electrothermal transducers are used, heat generated by the electrothermal transducers produces bubbles in ink which in turn expel ink from nozzles.

The valve 110 operates basically as follows. Normally, the valve rubber 112 closes by its elastic force an ink path between the ink accommodation space S and the ink supply port 103. When, as a result of ink ejection from the print head, an ink negative pressure on the ink supply port 103 side exceeds a predetermined level, the valve rubber 112 is deformed to open the ink path temporarily. This allows ink to be supplied from the ink accommodation space S to the ink supply port 103 and at the same time the negative pressure on the ink supply port 103 side returns to less than the predetermined level. This basic operation of the valve 110 maintains the ink in the print head at a predetermined negative pressure. A detailed construction and operation of the valve 110 will be described later.

The ink tank 200 accommodating a plurality of color inks (FIG. 5 and FIG. 6) has a similar construction to that of the ink tank 100. Inside the ink tank 200 are formed spaces for accommodating three different inks. These ink accommodation spaces are connected to ink supply ports 103A, 103B, 103C through valves 110A, 110B, 110C that function as negative pressure generation means. In this example, two valves 110A, 110B are arranged on one side surface of the ink tank 200 and one valve 110C is arranged on the other side surface. The head cartridge 300 (see FIG. 7) has an ink jet print head to eject ink supplied from the ink supply ports 103A, 103B, 103C through the valves 110A, 110B, 110C of the ink tank 200. These valves 110A, 110B, 110C keep the inks in the print head at a predetermined negative pressure by the basic operation similar to that of the valve 110 of the ink tank 100.

The ink tank 100 of FIG. 8 accommodating a single color ink is mounted on a different type of head cartridge from the one shown in FIG. 7. A case 101 is formed with an engagement claw 101A and a latch lever 101B for engagement with the head cartridge. In other respects the construction is similar to the ink tank of FIG. 1 to FIG. 4.

[Characteristic Construction and Operation]

Next, characteristic constructions and operations of this invention will be described in the following embodiments.

(First Embodiment)

FIGS. 16A, 16B and FIGS. 17A, 17B illustrate a first embodiment of this invention. These figures show an example construction of a valve 110 installed in the ink tank of the basic construction described above. As for other parts, their constructions are similar to the basic one described above.

A housing 111 is shaped like a bottomed cylinder which has a communication port 111A at a center of the bottom communicating with the flow path L2 on the ink supply port 103 side. A valve rubber 112 as a valve member has a cylindrical lip portion 112A, an annular edge portion 112B, and an annular undulated portion 112C, 112D disposed between the lip portion 112A and the edge portion 112B. The lip portion 112A is thinner than the annular undulated portion 112C, 112D and is formed to expand in diameter toward the free end (upward in FIG. 16A). The raised portion 112C is also a recessed portion when seen from a valve chamber R1 side and the recessed portion 112D is also a raised portion when seen from the valve chamber R1 side. Inside the lip portion 112A is formed a vertically extending communication path 112G. The edge portion 112B is fitted in an inner circumferential portion of the housing 111.

Figure 16A:
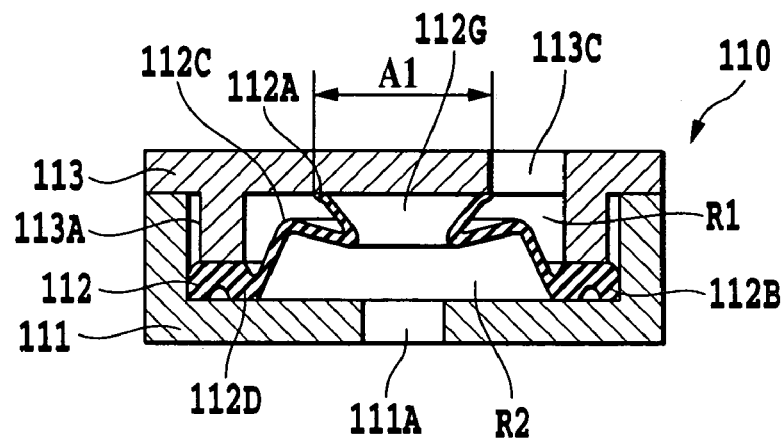
FIGS. 16A and 16B are cross-sectional views showing an operation of a valve according to a first embodiment of this invention.

The lip portion 112A is pressed against an underside of the flange 113 by an elastic recovery force of mainly the raised portion 112C, which is an intermediate part of the valve rubber 112. The lip portion 112A therefore is forced to expand in diameter toward the free end (upward in FIG. 16A). In the state of FIG. 16A, the lip portion 112A engages the underside of the flange 113 at an acute angle. Since the lip portion 112A is thinner than other portions, it has a smaller stiffness and is more easily deformable. That is, the lip portion 112A is capable of following the shape of the flange 113 with high flexibility and thus can be brought into reliable, intimate contact with the flange underside with a relatively weak pressing force. As the lip portion 112A is pressed against the flange 113, the free end of the lip portion 112A is deformed and expanded. The easily deformable lip portion 112A therefore can reliably and hermetically engage the flange 113 without forming wrinkles at its engagement portion, reliably closing the communication path 112G regardless of the smoothness of the engagement surface of the flange 113. As a result, the interior of the housing 111 is divided into a valve chamber R1 on the ink accommodation space S side and a valve chamber R2 on the ink supply port 103 side. As described later, the lip portion 112A and the raised portion 112C of the annular undulated portion, which is an intermediate part of the valve rubber 112, function as a valve.

The flange 113 is shaped like a disc and closes an upper opening of the housing 111. The flange 113 has on its underside a cylindrical portion 113A that fits in an inner circumferential portion of the housing 111. A lower end of the cylindrical portion 113A presses the edge portion 112B to hold the valve rubber 112 in its place. The flange 113 is formed with communication ports 113C connected to the flow path L1 on the ink accommodation space S side.

The housing 111 and the flange 113 are formed of a plastic material and their joint surfaces are joined together as by ultrasonic fusing. The housing 111, valve rubber 112 and flange 113 along with the O-ring (not shown in the figures) form a valve unit. This valve unit is incorporated into the valve chamber 105 formed in the case 101 of the ink tank as described above. Then, the valve film 106 is fused to close the opening of the valve chamber 105.

The ink tank in which the valve 110 is installed as described above is now mounted together with the head cartridge 300 on the printing apparatus.

Figure 16B:
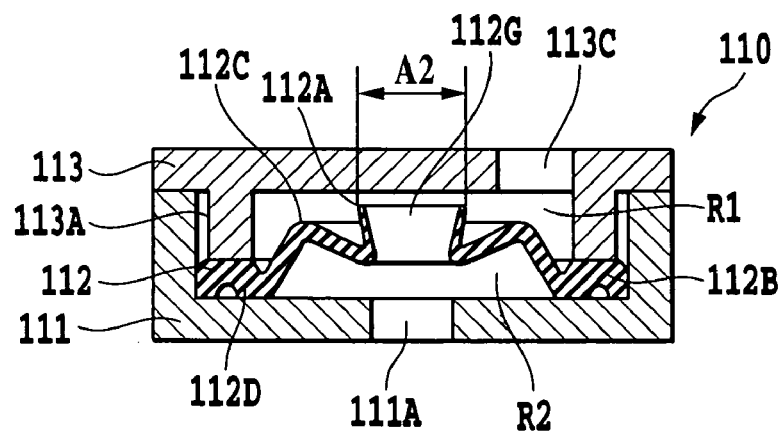
Figure 17A:
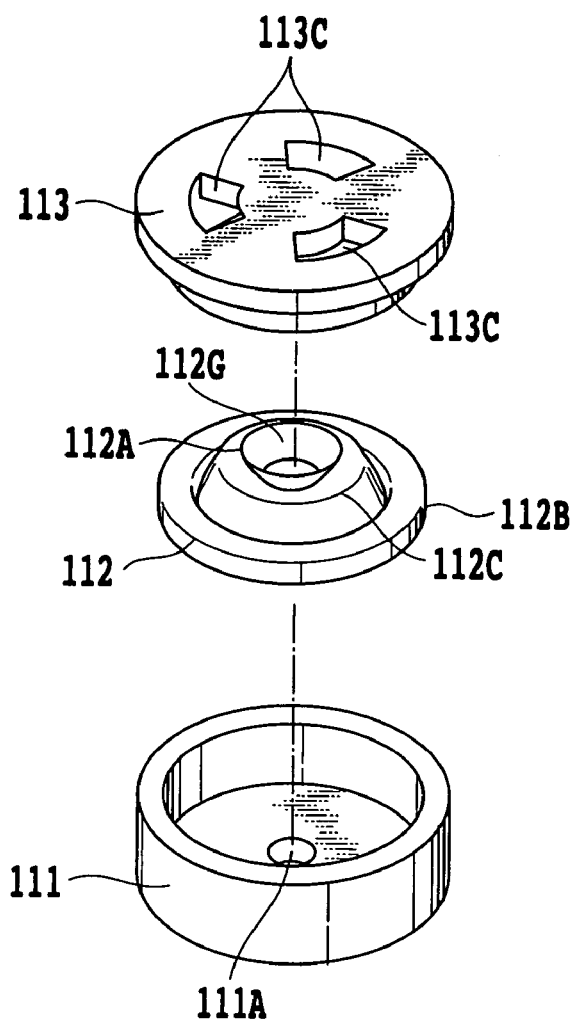
FIG. 17A is an exploded perspective view of the valve of FIG. 16A as seen from above and FIG. 17B is an exploded perspective view of the valve of FIG. 16A as seen from below.
Figure 17B:
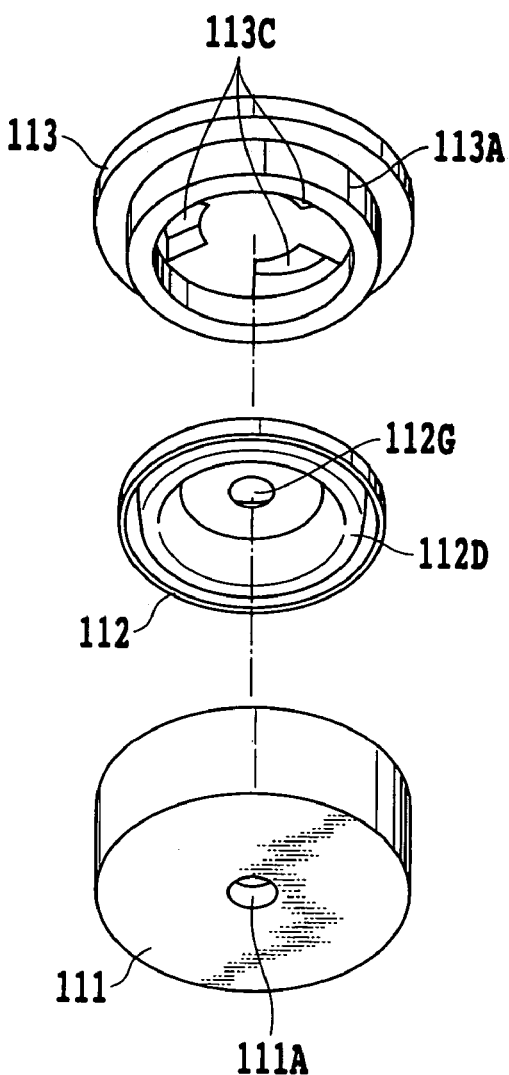
Figure 18A:
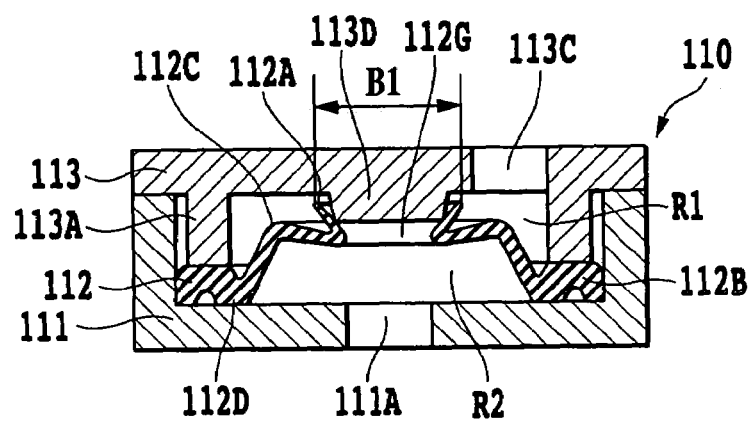
FIGS. 18A and 18B are cross-sectional views showing an operation of a valve according to a second embodiment of this invention.
Figure 18B:
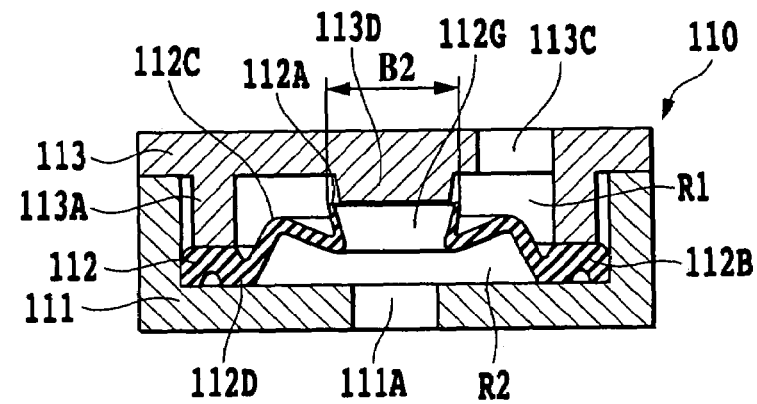
Figure 19A:
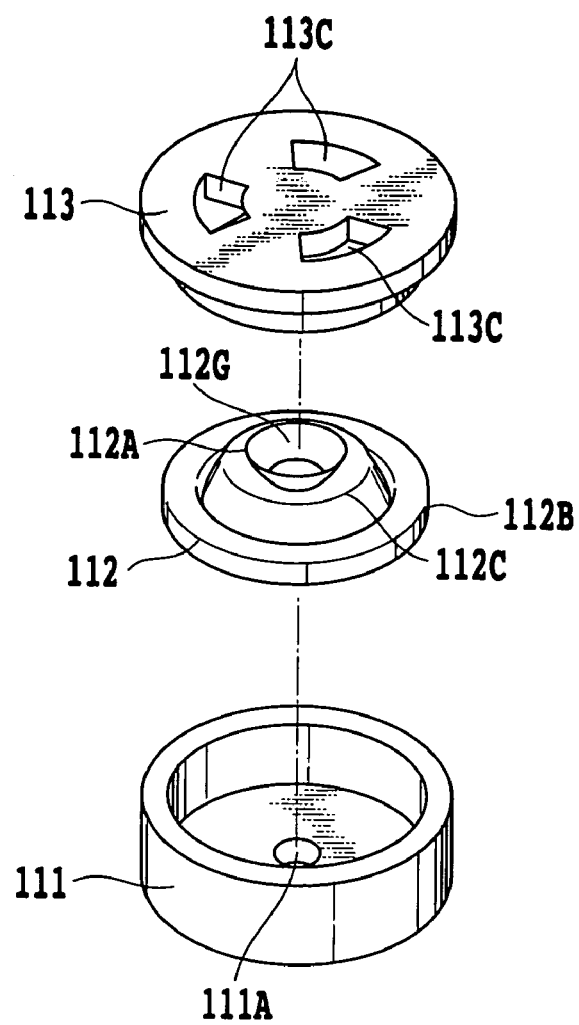
FIG. 19A is an exploded perspective view of the valve of FIG. 18A as seen from above and FIG. 19B is an exploded perspective view of the valve of FIG. 18A as seen from below.
Figure 19B:
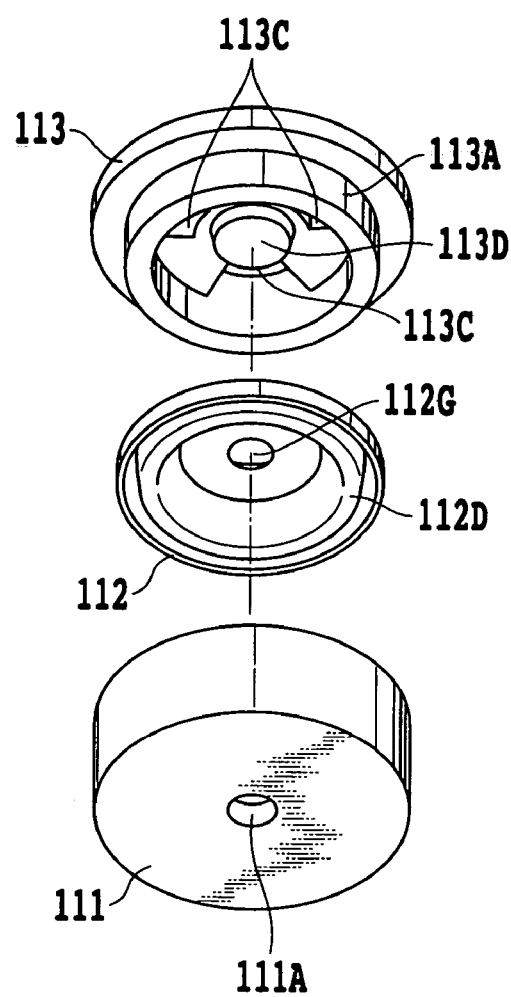

In the initial state of the valve 110 as shown in FIG. 16A, the lip portion 112A closes the communication path 112G. In this state, the print head undergoes a recovery operation, in which ink is discharged from nozzles of the print head. This recovery operation is intended to keep an ink ejection performance of the print head in good condition and may include a suction-based recovery operation that sucks out from nozzles ink not contributing to image forming and a preliminary ejection that ejects ink not contributing to image forming. As ink in the valve chamber R2 is consumed by the recovery operation, the pressure in the valve chamber R2 decreases. When the pressure in the valve chamber R2 falls to a predetermined degree, the raised portion 112C deforms as shown in FIG. 16B causing the lip portion 112A to part from the underside of the flange 113 to open the communication path 112G temporarily. This allows ink to be supplied from the valve chamber R1 side to the valve chamber R2 side, alleviating the negative pressure in the valve chamber R2. This sequence of operation is also activated during the printing operation when the pressure in the valve chamber R2 falls. This assures an intermittent ink supply to the ink supply port.

(Second Embodiment)

FIGS. 18A, 18B and FIGS. 19A, 19B illustrate a second embodiment of this invention. These figures show another example of the valve 110 installed in the ink tank of the basic construction described above. As for other parts, their constructions are similar to the basic one described above.

The flange 113 of this embodiment is formed with a protruding portion 113D. This embodiment differs from the first embodiment only in the shape of the flange 113. Thus, this embodiment also functions in ways similar to the first embodiment.

As in the first embodiment, the lip portion 112A is pressed against an underside of the flange 113 mainly by an elastic recovery force of the raised portion 112C, which is an intermediate part of the valve rubber 112. The lip portion 112A therefore is forced to expand in diameter toward the free end (upward in FIG. 18A). Since the lip portion 112A is thinner than other portions, it has a smaller stiffness and is more easily deformable. That is, the lip portion 112A is capable of following the shape of the flange 113 with high flexibility and thus can be brought into reliable, intimate contact with the flange underside. Further, in this embodiment, the free end of the lip portion 112A engages an edge of the protruding portion 113D of the flange 113 as it deforms and expands. The easily deformable lip portion 112A therefore does not produce wrinkles at its engagement portion with the flange 113. Since the lip portion 112A engages the edge of the protruding portion 113D of the flange 113, a contact pressure between them is small and their intimate contact can be realized with a relatively weak pressing force. As a result, it is possible to reduce the pressure required to open the valve during the ink supply and thereby minimize variations in the negative pressure of the nozzles.

(Third Embodiment)

FIGS. 20A, 20B and FIGS. 21A, 21B illustrate a third embodiment of this invention. These figures show still another example of the valve 110 installed in the ink tank of the basic construction described above. As for other parts, their constructions are similar to the basic one described above.

The flange 113 of this embodiment is formed with a protruding portion 113D. This embodiment differs from the first and second embodiments only in the shape of the flange 113. Thus, this embodiment also functions in ways similar to the preceding embodiments.

As in the first embodiment, the lip portion 112A is pressed against an underside of the flange 113 mainly by an elastic recovery force of the raised portion 112C, which is an intermediate part of the valve rubber 112. The lip portion 112A therefore is forced to expand in diameter toward the free end (upward in FIG. 20A). Since the lip portion 112A is thinner than other portions, it has a smaller stiffness and is more easily deformable. That is, the lip portion 112A is capable of following the shape of the flange 113 with high flexibility and thus can be brought into reliable, intimate contact with the flange underside. Further, in this embodiment, the free end of the lip portion 112A engages a side tapered portion of the protruding portion 113D of the flange 113 as it deforms and expands. The easily deformable lip portion 112A therefore does not produce wrinkles at its engagement portion with the flange 113. Since the lip portion 112A comes into intimate contact with the tapered portion of the protruding portion 113D, they engage over a relatively wide area. As a result, the valve closed state can be kept more stable. Further, when the valve rubber 112 shifts from an open state to a closed state, if the valve rubber 112 fails to perform a translational movement with respect to the flange 113 and twists slightly, the ability of the lip portion 112A to flexibly expand and follow the shape of the tapered protruding portion 113D ensures a reliable, intimate engagement between them, allowing the twisting action of the valve rubber 112.

Figure 20A:
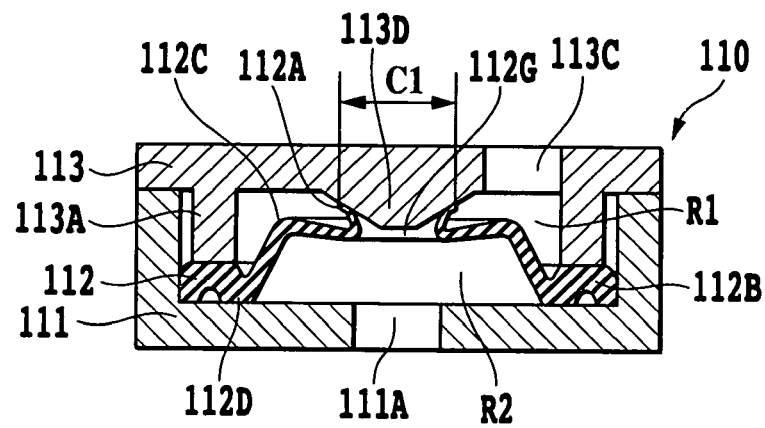
FIGS. 20A and 20B are cross-sectional views showing an operation of a valve according to a third embodiment of this invention.
Figure 20B:
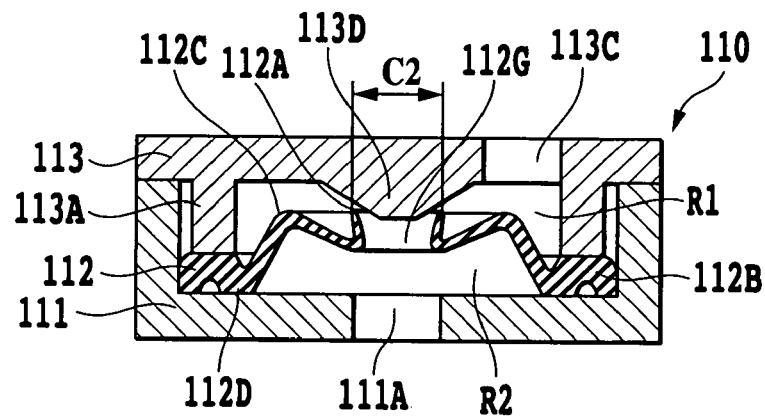
Figure 22A:
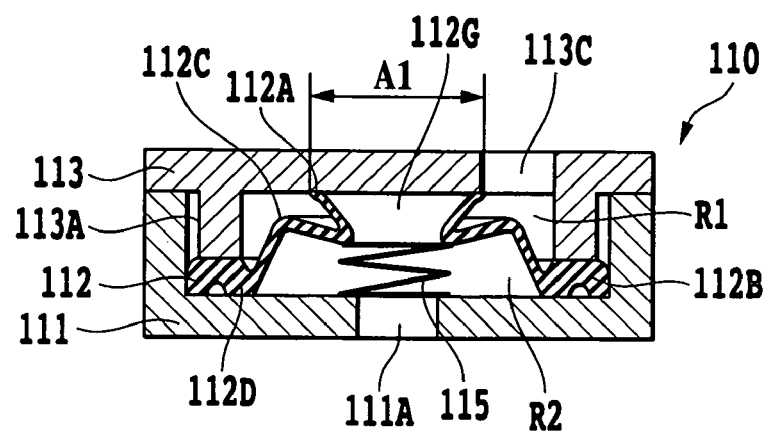
FIGS. 22A and 22B are cross-sectional views showing an operation of a valve according to a fourth embodiment of this invention.
Figure 22B:
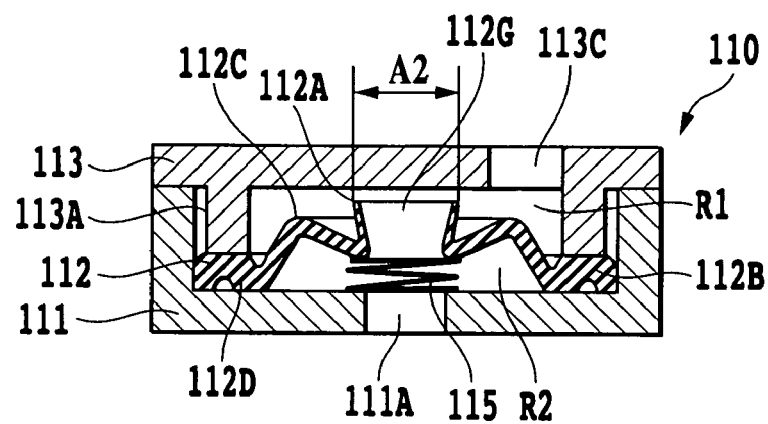
Figure 23A:
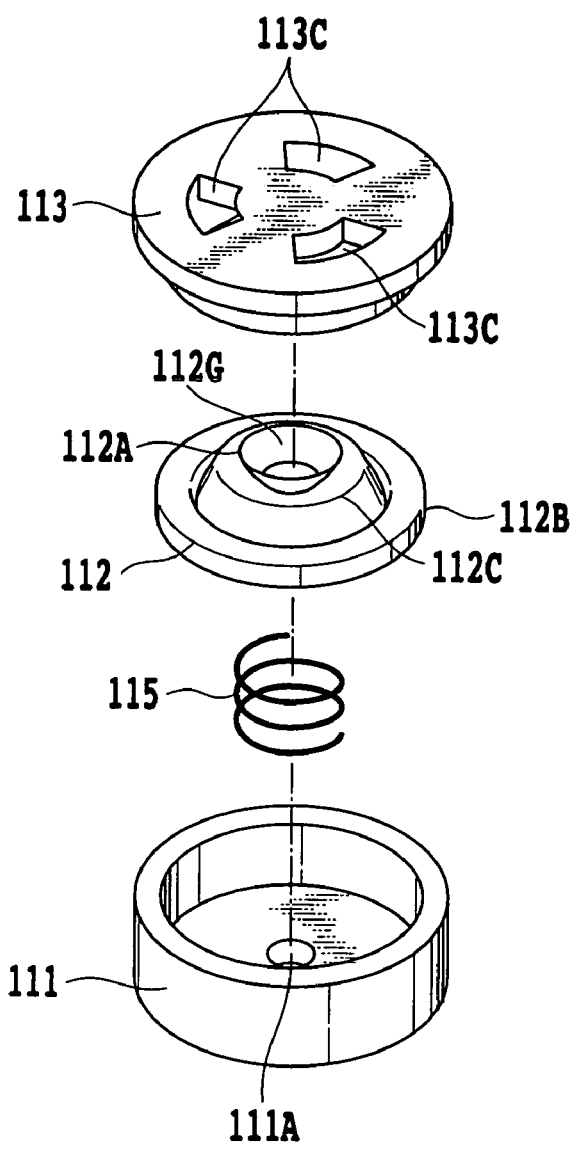
FIG. 23A is an exploded perspective view of the valve of FIG. 22A as seen from above and FIG. 23B is an exploded perspective view of the valve of FIG. 20A as seen from below.
Figure 23B:
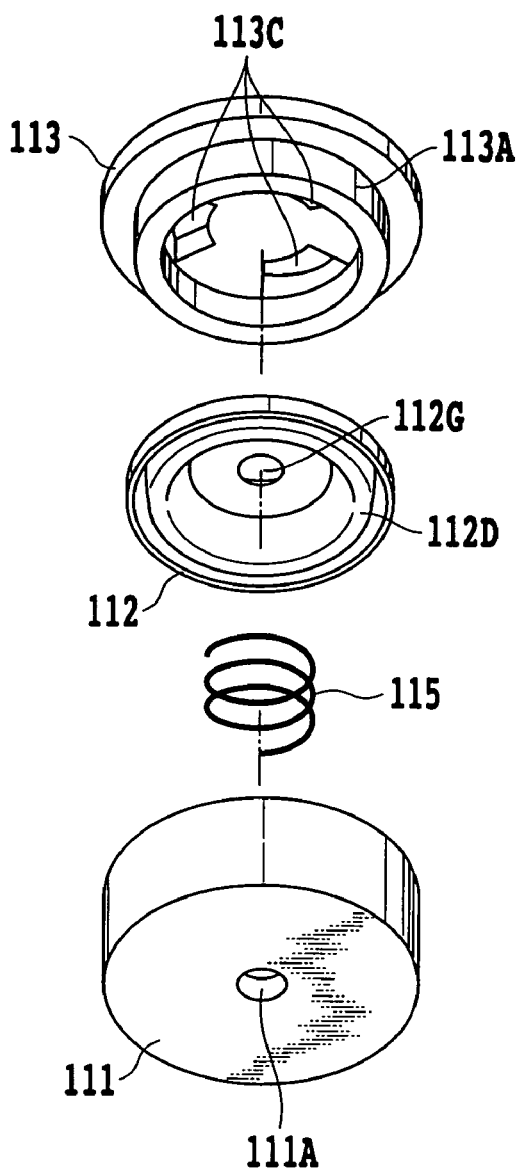

Further, in this embodiment, since the protruding portion 113D has a tapered portion, the open lip portion 112A does not need to be shaped to expand in diameter toward its free end (upward in FIG. 20A). When the valve is closed, the free end of the lip portion 112A can be guided onto and engages the tapered, protruding portion 113D as it is deformed and expanded. That is, a reliable intimate contact can be obtained. In this shape, since the lip portion 112A does not expand in diameter toward its free end, the valve rubber 112 has no undercut shape and thus has an improved moldability.

(Fourth Embodiment)

FIGS. 22A, 22B and FIGS. 23A, 23B illustrate a fourth embodiment of this invention. These figures show a further example of the valve 110 installed in the ink tank of the basic construction described above. As for other parts, their constructions are similar to the basic one described above.

This embodiment differs from the first embodiment in that it has a spring 115, a separate biasing means. This embodiment therefore functions in ways similar to the preceding embodiments.

Unlike the first embodiment, the lip portion 112A is pressed against an underside of the flange 113 mainly by an elastic recovery force of the spring 115. The lip portion 112A therefore is forced to expand in diameter toward the free end (upward in FIG. 22A). The stiffness of the lip portion 112A is relatively weak and is therefore easily deformed by a biasing force of the spring 115. That is, it is capable of following the shape of the flange 113 with high flexibility and thus can be brought into reliable, intimate contact with the flange underside. Further, in this embodiment, the free end of the lip portion 112A engages the flange 113 as it deforms and expands. The easily deformable lip portion 112A therefore can come into intimate contact with the flange 113, without forming any wrinkles at its engagement portion, to keep the valve closed in good condition. In this construction, by properly adjusting the biasing force of the spring 115, it is possible to control the pressure required to open the valve for ink supply, i.e., to adjust the negative pressure for the nozzles.

While in this embodiment a coil spring is used as a biasing means, other elastically deformable means for biasing the lip portion 112A may be used, such as a leaf spring.

(Fifth Embodiment)

FIGS. 9A to 11A illustrate a fifth embodiment of this invention. These figures show a further example of the valve 110 installed in the ink tank of the basic construction described above. As for other parts, their constructions are similar to the basic one described above.

A housing 111 is shaped like a bottomed cylinder which has a communication port 111A at a center of the bottom communicating with the flow path L2 on the ink supply port 103 side. The bottom inner surface of the housing 111 is formed with a plurality (in this example, three) of communication grooves 111B at equal intervals in a circumferential direction. A valve rubber 112 as a valve member has a lip portion 112A, an annular edge portion 112B, and inner and outer, annular undulated portions interposed between the lip portion 112A and the edge portion 112B. The lip portion 112A is thinner than the annular undulated portion 112C, 112D and shaped to expand in diameter toward its free end (upward in FIG. 9A). The inner, annular undulated portion has a relatively thin, annular raised portion 112C and a relatively thick, annular recessed portion 112D. Similarly, the outer, annular undulated portion has a relatively thin, annular raised portion 112E and a relatively thick, annular recessed portion 112F. The raised portions 112C, 112E are also recessed portions when seen from the valve chamber R1 side, and the recessed portions 112D, 112F are also raised portions when seen from the valve chamber R1. Inside the lip portion 112A is formed a vertically extending communication path 112G. The edge portion 112B is fitted in an inner circumferential portion of the housing 111.

Figure 9A:
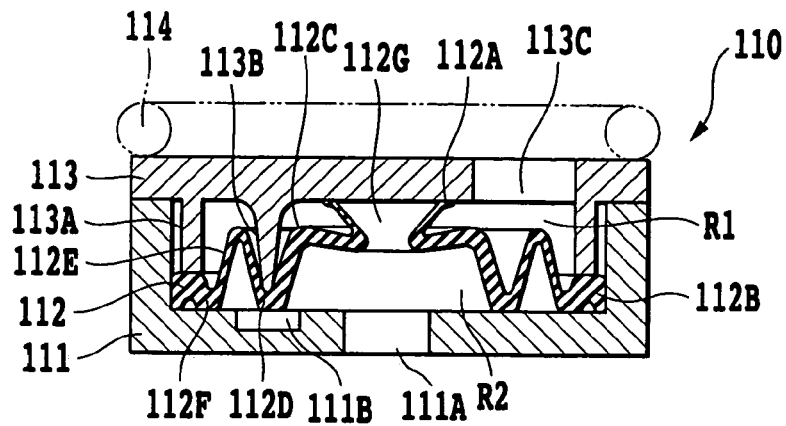
FIGS. 9A, 9B and 9C are cross-sectional views showing an operation of a valve according to a fifth embodiment of this invention.

The lip portion 112A is pressed against an underside of the flange 113 by an elastic recovery force of mainly the inner raised portion 112C and is therefore forced to expand in diameter toward its free end (upward in FIG. 9A). Since the lip portion 112A is thinner than other portions, it has a smaller stiffness and is more easily deformable. That is, the lip portion 112A is capable of following the shape of the flange 113 with high flexibility and thus can be brought into reliable, intimate contact with the flange underside with a relatively weak pressing force. As the lip portion 112A is pressed against the flange 113, the free end of the lip portion 112A is deformed and expanded. The easily deformable lip portion 112A therefore can reliably and hermetically engage the flange 113 without forming any wrinkles at its engagement portion. As a result, the communication path 112G is closed, dividing the interior of the housing 111 into a valve chamber R1 on the ink accommodation space S side and a valve chamber R2 on the ink supply port 103 side. The lip portion 112A and the raised portion 112C of the inner, annular undulated portion function mainly as a valve means and the raised portion 112E of the outer, annular undulated portion functions mainly as a damper means.

The flange 113 is shaped like a disc and closes an upper opening in the housing 111. An underside of the flange 113 is formed with a cylindrical portion 113A that fits in an inner circumferential portion of the housing 111 and with a plurality (in this example, three) of legs 113B at equal intervals in a circumferential direction. A lower end of the cylindrical portion 113A presses the edge portion 112B to hold the valve rubber 112 in its place. Lower ends of the legs 113B fit into the inner recessed portion 112D to restrict the recessed portion 112D to positions above the communication-grooves 111B of the housing 111. The flange 113 is also formed with communication ports 113C communicating with the flow path L1 on the ink accommodation space S side.

The housing 111 and the flange 113 are formed of a plastic material and their joint surfaces are joined together as by ultrasonic fusing. The housing 111, valve rubber 112 and flange 113 along with the O-ring (not shown in these figures) form a valve unit. This valve unit is incorporated into the valve chamber 105 formed in the case 101 of the ink tank, as described earlier. Then, the valve film 106 is fused to close the opening of the valve chamber 105.

The ink tank in which the valve 110 is installed as described above is now mounted together with the head cartridge 300 on the printing apparatus.

Figure 11:
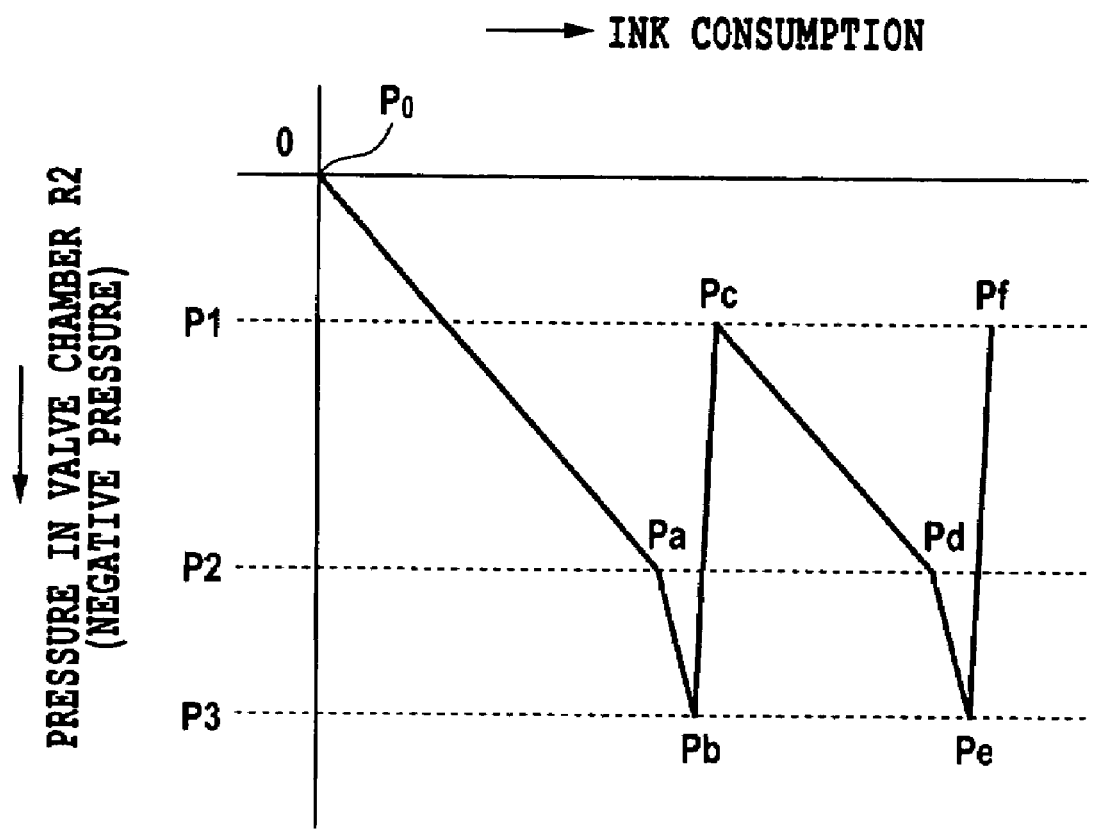
FIG. 11 is a diagram showing negative pressure changes in the valve of FIG. 9A.

In the initial state of the valve 110 as shown in FIG. 9A, there is no negative pressure in the valve chamber R2 on the ink supply port 103 side, as indicated at point in time P0 in FIG. 11, and the lip portion 112A closes the communication path 112G. In this state, ink is discharged from the print head by performing a recovery operation. This recovery operation is intended to keep an ink ejection performance of the print head in good condition and may include a suction-based recovery operation that sucks out from nozzles ink not contributing to image forming and a preliminary ejection that ejects ink not contributing to image forming. As ink in the valve chamber R2 is consumed by the recovery operation, the pressure in the valve chamber R2 falls as indicated by P1, P2 and P3 in FIG. 11.

Figure 9B:
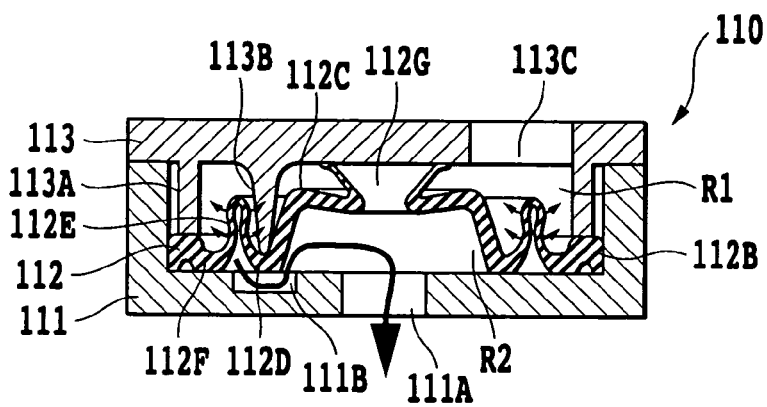

Up to point in time Pa when the pressure in the valve chamber R2 reaches P2, the outer raised portion 112E deforms greatly as shown in FIG. 9B. Ink in a space under the outer raised portion 112E is drawn out through the communication grooves 111B. The legs 113B are situated between the outer raised portion 112E and the inner raised portion 112C to prevent the inner raised portion 112C from being deformed as the outer raised portion 112E is deformed. Thus, as described later, the inner and outer raised portions 112C, 112E do not interfere with each other and reliably function as a valve means and as a damper means, respectively.

Figure 9C:
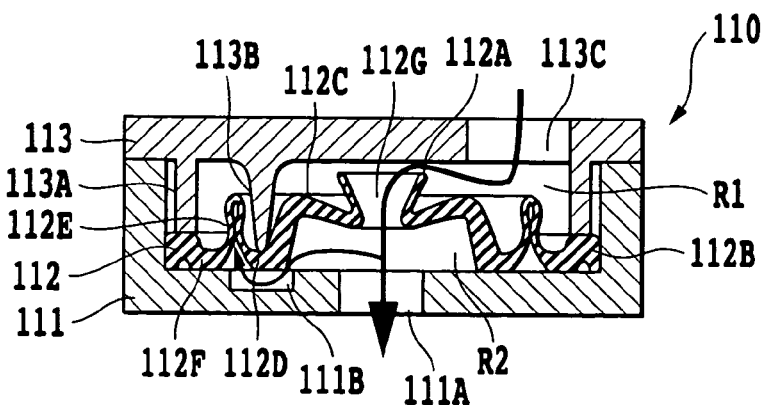
Figures 10A, 10B:
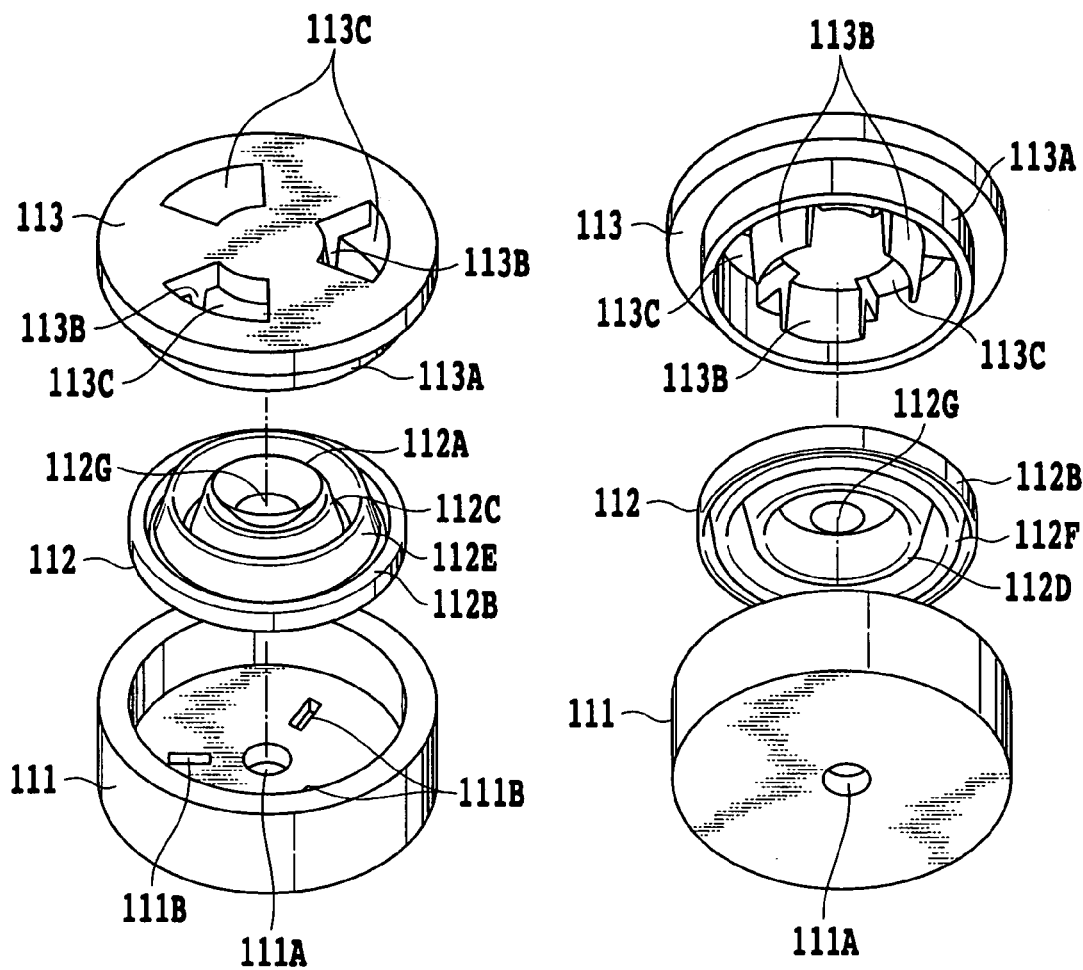
FIG. 10A is an exploded perspective view of the valve of FIG. 9A as seen from above and FIG. 10B is an exploded perspective view of the valve of FIG. 9A as seen from below.

At point in time Pb when the pressure in the valve chamber R2 falls to P3, the deformation of the inner raised portion 112C causes the lip portion 112A to part from the underside of the flange 113, as shown in FIG. 9C, to temporarily open the communication path 112G. This allows ink to flow from the valve chamber R1 to the valve chamber R2, reducing the negative pressure in the valve chamber R2. At the same time, ink also flows into the space under the outer raised portion 112E through the communication grooves 111B.

The outer raised portion 112E is so set that a part of its deformation remains even after the communication path 112G is closed. Therefore, the negative pressure in the valve chamber R2 that was present at point in time Pb of FIG. 11 is not fully released because of an elastic recovery force corresponding to the residual deformation of the outer raised portion 112E (see FIG. 9B), leaving a predetermined negative pressure (residual negative pressure), P1, to remain in the valve chamber R2 (at point in time Pc). Once the residual pressure P1 is produced in the valve chamber R2, the print head performs its normal printing operation to eject ink from its nozzles. The negative pressure in the valve chamber R2 increases to P2 and P3 in FIG. 11 as ink consumption proceeds. Then, in a manner described above, the valve 110 is activated to keep the pressure in the valve chamber R2 in an appropriate range between P1 and P3. As a result, ink meniscuses are formed in the nozzles of the print head in a satisfactory condition, making it possible to eject ink reliably and also prevent ink leakage from the nozzles.

In FIG. 11, the negative pressure rise curve from P1 to P2 depends mainly on the elastic recovery force which corresponds to the deformation of the outer raised portion 112E. The outer raised portion 112E functions as a damper and keeps the pressure at P1 by the elastic recovery force (residual recovery force) which corresponds to the residual deformation, as described above. The lip portion 112A and the inner raised portion 112C serve as a valve means and, when the pressure reaches a valve opening pressure P3, temporarily open the communication path 112G as described above. In this example, the valve means and the damper means are formed as annular undulated portions situated around the communication path 112G. The outer raised portion 112E is set optimally to work as a damper means. In this example, the outer raised portion 112E is formed thinner than other portions in the valve rubber 112. Further, the angle formed by the outer raised portion 11 2E in the valve chamber R2 is set to a smaller acute angle than that formed by the inner raised portion 112C in the valve chamber R2. Thus, by forming the outer raised portion 112E so that it has a smaller acute angle, the outer raised portion 112E is made more easily deformable than the inner raised portion 112C and therefore more reliable to perform its damper function.

This embodiment can provide an ink tank with an improved reliability because the ink tank has a mechanism that applies a definite ink holding force (=negative pressure).

(Sixth Embodiment)

FIGS. 12A, 12B, 12C and FIGS. 13A, 13B illustrate a sixth embodiment of this invention.

Figure 12A:
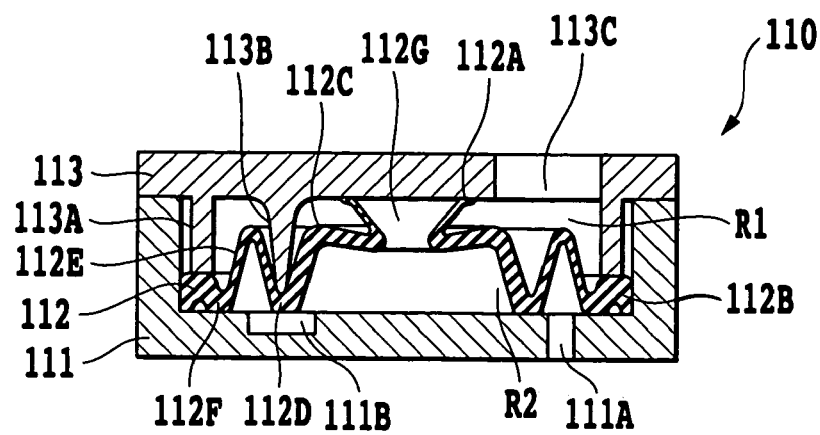
FIGS. 12A, 12B and 12C are cross-sectional views showing an operation of a valve according to a sixth embodiment of this invention.
Figure 12B:
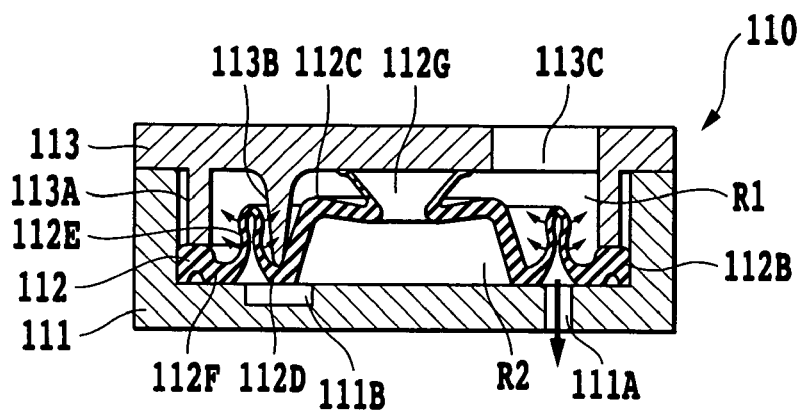
Figure 12C:
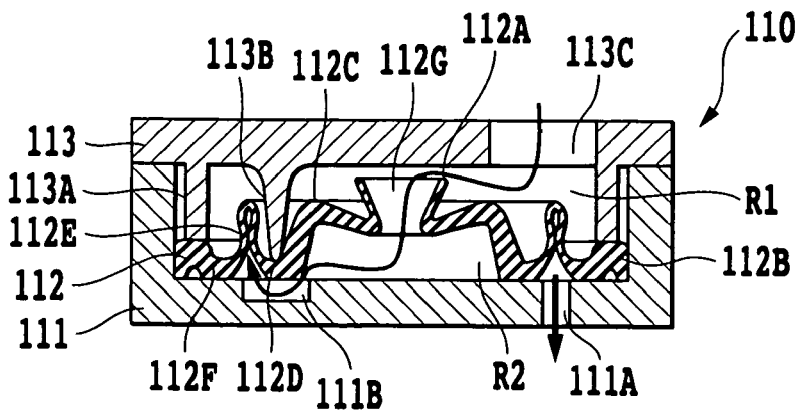
Figures 13A, 13B:
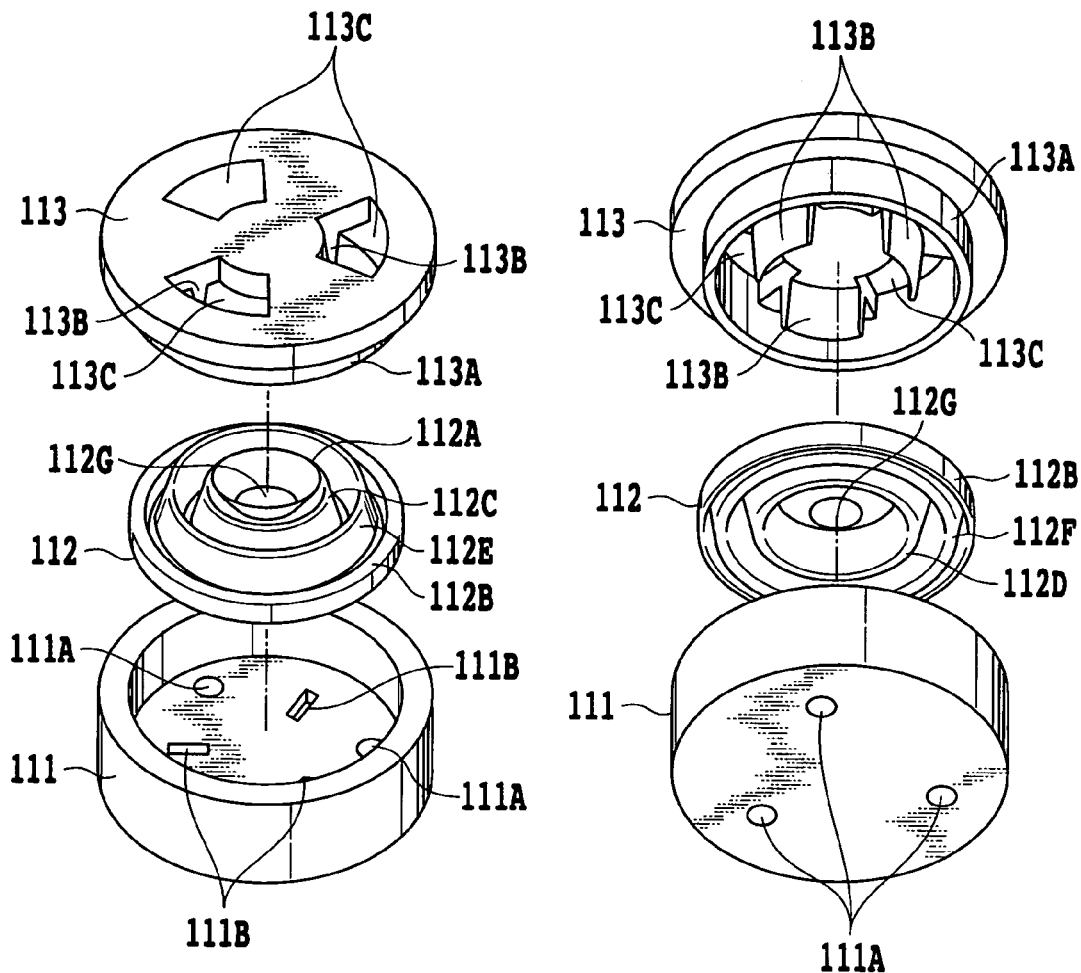
FIG. 13A is an exploded perspective view of the valve of FIG. 12A as seen from above and FIG. 13B is an exploded perspective view of the valve of FIG. 12A as seen from below.

In this embodiment, the housing 111 has a plurality (in this example, three) of communication ports 111A formed at equal intervals in a circumferential direction at positions facing a space under the outer raised portion 112E. This embodiment differs from the fifth embodiment only in the position of the communication ports 111A. Thus, this embodiment functions in a way similar to the previous embodiment. It is noted, however, that, as shown in FIG. 12B and FIG. 12C, ink in the valve chamber R2 is supplied from the space under the outer raised portion 112E, which functions as a damper, through the communication port 111A. This construction prevents a stagnation of ink in the space under the outer raised portion 112E and assures a smooth supply of ink.

(Seventh Embodiment)

Figure 14:
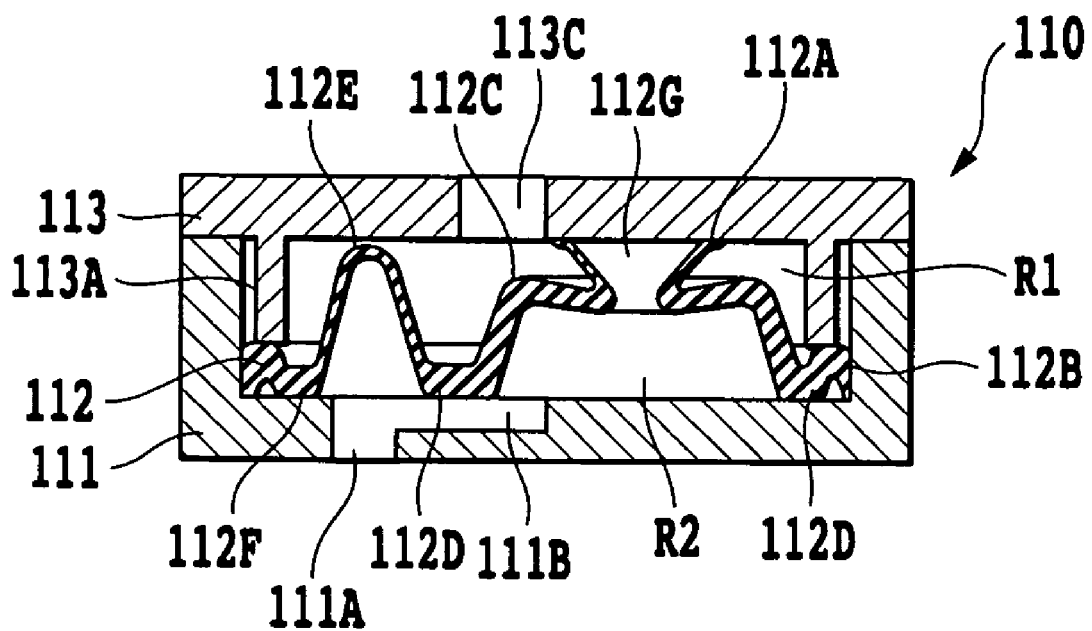
FIG. 14 is a cross-sectional view showing an operation of a valve according to a seventh embodiment of this invention.
Figure 15A:
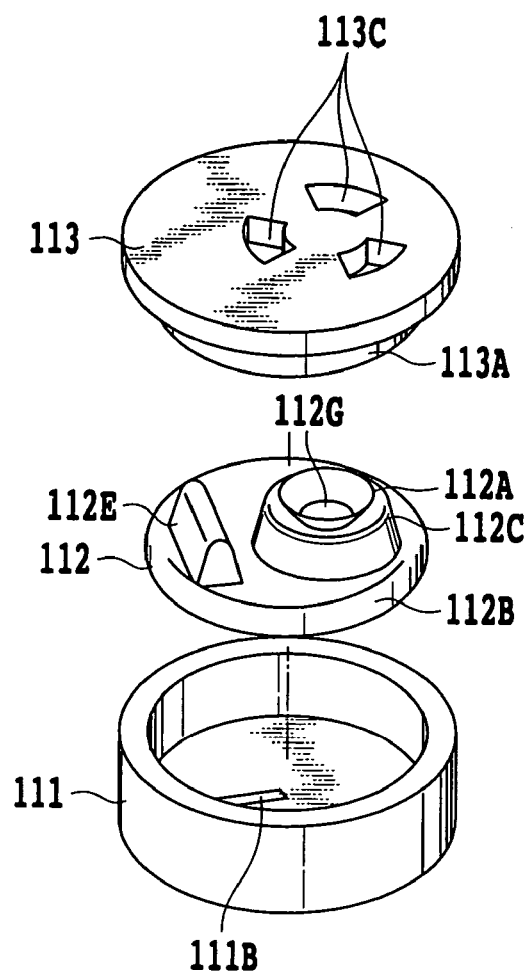
FIG. 15A is an exploded perspective view of the valve of FIG. 14 as seen from above and FIG. 15B is an exploded perspective view of the valve of FIG. 14 as seen from below.
Figure 15B:
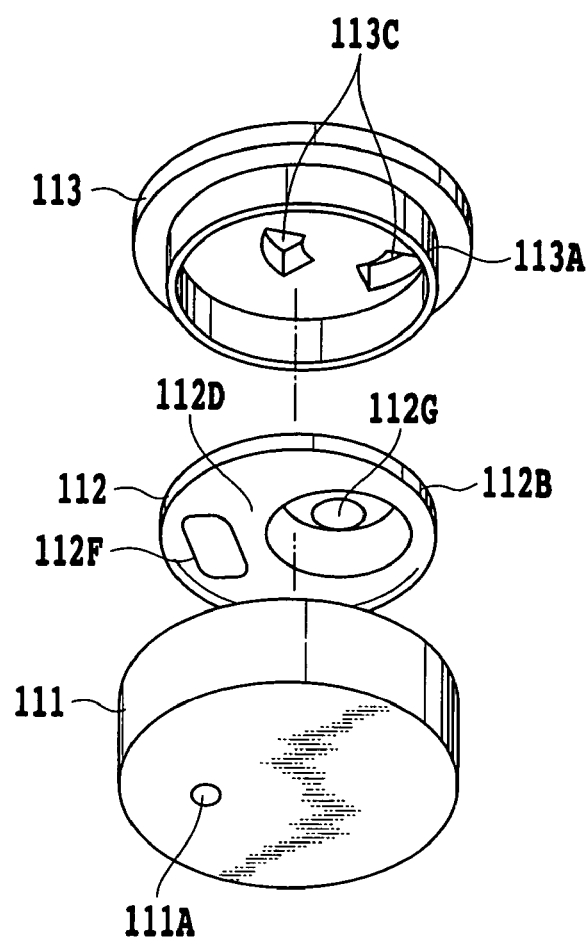

FIGS. 14 and FIGS. 15A, 15B illustrate a seventh embodiment of this invention.

In this embodiment, a raised portion 112E of the valve rubber 112, which functions as a damper, is linearly formed at a position remote from a circumference of the communication path 112G. An annular recessed portion 112D situated at an outer circumference of the raised portion 112C is pressed against an upper surface of the housing 111 to block the raised portion 112C (valve means) from being deformed by the deformation of the raised portion 112E (damper means). Therefore, these raised portions 112C, 112E can reliably perform their valve and damper functions, respectively, without interfering with each other. As in the sixth embodiment, the communication port 111A of the housing 111 is formed at a position facing the space under the raised portion 112E. Therefore, in a manner similar to that of the sixth embodiment, ink in the valve chamber R2 is supplied through the communication groove 111B, the space under the raised portion 112E and the communication port 111A. This embodiment works as in the preceding embodiments.

This invention has been described in conjunction with first to seventh embodiments. It is of course possible to combine constitutional elements of individual embodiments arbitrarily.

The present invention has been described in detail with respect to preferred embodiments, and it will now be apparent from the foregoing to those skilled in the art that changes and modifications may be made without departing from the invention in its broader aspects, and it is the intention, therefore that the appended claims cover all such changes and modifications as fall within the true spirit of the invention.

What is claimed is:

1. An ink tank comprising:
    an ink accommodation portion;
    an ink supply port; and
    a valve installed in an ink path between said ink accommodation portion and said ink supply port,
    wherein said valve is deformed to temporarily open the ink path to introduce ink from said ink accommodation portion to said ink supply port,
    wherein said valve has a valve member formed of an elastic material and having an opening on an inner side and a valve case accommodating the valve member,
    wherein an inner end of the opening in the valve member engages the valve case to close the ink path, and an angle formed by an inner surface of the opening in the valve member and a surface of the valve case with which the valve member engages is an acute angle,
    wherein, when a negative pressure in said ink supply port exceeds a predetermined level, said valve opens the ink path temporarily to introduce ink from said ink accommodation portion to said ink supply port,
    wherein the valve member is formed of an elastic material and integrally includes a valve portion for opening and closing the ink path and a damper portion, the damper portion being more easily deformable than the valve portion and being adapted to apply a negative pressure to ink in said ink supply port by an elastic recovery force produced when the damper portion is elastically deformed,
    wherein restraining means is provided for restraining a position of a part of the valve member between the valve portion and the damper portion, and
    wherein the restraining means includes legs that fit into a recessed portion between the valve portion and the damper portion.

* * * * *

UNITED STATES PATENT AND TRADEMARK OFFICE
CERTIFICATE OF CORRECTION

| | | |
|---|---|---|
| PATENT NO. | : 7,108,361 B2 | Page 1 of 1 |
| APPLICATION NO. | : 10/833107 | |
| DATED | : September 19, 2006 | |
| INVENTOR(S) | : Kitabatake et al. | |

It is certified that error appears in the above-identified patent and that said Letters Patent is hereby corrected as shown below:

COLUMN 1:
Lines 14-42, should deleted and replaced with the following:

--A conventional ink tank of this kind is found, for example, in Japanese Patent Application Laid-open No. 2003-034041 (referred to as a "Patent Reference 1") which discloses an ink tank having a negative pressure generation means in the form of a valve structure constructed of a valve film and a spring. In this ink tank, an ink path is formed between an ink accommodation portion and an ink supply port connected to a print head and has a negative pressure generation means of a valve structure arranged therein. Normally the valve film is pressed against a valve seat by a force of the spring to close the ink path. When, as a result of ink ejection from the print head, a negative pressure on the ink supply port side exceeds a predetermined level, the valve film is parted from the valve seat against the force of the spring to open the ink path temporarily. Then, ink is supplied from the ink accommodation portion to the ink supply port through the ink path and at the same time the negative pressure on the ink supply port side returns to below the predetermined level.--

Line 57, "that much" should read --more--.

COLUMN 6:
Line 20, "11 2A" should read --112A--.

Signed and Sealed this

First Day of July, 2008

JON W. DUDAS
*Director of the United States Patent and Trademark Office*